US009691106B2

(12) United States Patent
Shaouy et al.

(10) Patent No.: US 9,691,106 B2
(45) Date of Patent: Jun. 27, 2017

(54) LOCATION BASED FRIEND FINDING

(75) Inventors: William Philip Shaouy, Atlanta, GA (US); Matthew Adam Terry, Dunwoody, GA (US)

(73) Assignee: International Business Machines Corporation, Armonk, NY (US)

( * ) Notice: Subject to any disclaimer, the term of this patent is extended or adjusted under 35 U.S.C. 154(b) by 1076 days.

(21) Appl. No.: 12/886,200

(22) Filed: Sep. 20, 2010

(65) Prior Publication Data
US 2012/0072359 A1  Mar. 22, 2012

(51) Int. Cl.
*G06Q 50/00* (2012.01)
*G06Q 10/10* (2012.01)

(52) U.S. Cl.
CPC ............ *G06Q 50/01* (2013.01); *G06Q 10/10* (2013.01)

(58) Field of Classification Search
USPC ............ 705/319, 318, 7.33; 455/456.3, 566; 709/224; 345/173
See application file for complete search history.

(56) References Cited

U.S. PATENT DOCUMENTS

| | | | |
|---|---|---|---|
| 7,593,740 B2* | 9/2009 | Crowley et al. | 455/456.3 |
| 2003/0233270 A1 | 12/2003 | Buss | |
| 2008/0104227 A1* | 5/2008 | Birnie | H04W 4/02 709/224 |
| 2008/0140650 A1* | 6/2008 | Stackpole | 707/5 |
| 2008/0270158 A1* | 10/2008 | Abhyanker | 705/1 |
| 2009/0144075 A1* | 6/2009 | Flinn et al. | 705/1 |
| 2009/0153492 A1* | 6/2009 | Popp | G06F 3/04883 345/173 |
| 2009/0164574 A1 | 6/2009 | Hoffman | |
| 2009/0204601 A1* | 8/2009 | Grasset | 707/5 |
| 2009/0216551 A1* | 8/2009 | Chen et al. | 705/1 |
| 2009/0248807 A1* | 10/2009 | Fron et al. | 709/206 |
| 2009/0319288 A1 | 12/2009 | Slaney et al. | |

(Continued)

OTHER PUBLICATIONS

Basuga et al., "The MAgNet: Agent-based Middleware Enabling Social Networking for Mobile Users", The 10th International Conference on Telecommunications Zagreb, Croatia, Jun. 8-10, 2009 IEEE, pp. 1-8.

(Continued)

*Primary Examiner* — Kathleen Palavecino
*Assistant Examiner* — Andrew Whitaker
(74) *Attorney, Agent, or Firm* — Yee & Associates, P.C.; Maeve M. Carpenter

(57) ABSTRACT

A method, data processing system, and computer program product for locating people. A mobile data processing system identifies a number of degrees of separation from a requestor for use in searching for the people. The mobile data processing system searches a network data processing system for data structures that contain information about associations between the people that are within the number of degrees of separation from the requestor to generate an initial group of people. The mobile network data processing system identifies a group of people from the initial group of people that are within a geographic location based on a location of the mobile data processing system and a portion of the group of people who are online. The mobile data processing system displays the portion of the group of people on a display device for the mobile data processing system.

20 Claims, 14 Drawing Sheets

(56) References Cited

U.S. PATENT DOCUMENTS

2010/0087230 A1* 4/2010 Peh .................... G06F 3/04817
　　　　　　　　　　　　　　　　　　　　　　　455/566
2011/0064074 A1* 3/2011 Kreitzberg ............. H04L 67/24
　　　　　　　　　　　　　　　　　　　　　　　370/352

OTHER PUBLICATIONS

Upadhyaya et al., "Managing and Integrating Social Networks in P2P Infrastructure", 2009 IEEE, pp. 1-6.
Zhou et al., "Learning a Probabilistic Semantic Model from Heterogeneous Social Networks for Relationship Identification", 2008 IEEE 20th International Conference on Tools with Artificial Intelligence, pp. 343-350.
Finin et al., "Social Networking on the Semantic Web", 2005, University of Maryland, Baltimore MD, pp. 1-19.
Golbeck et al., "Linking Social Networks on the Web with FOAF", WWW2008 Apr. 2008 Beijing China, pp. 1-10.

* cited by examiner

FIG. 4

```
                    400                                                    402
                     ↘                                                      ↗
<div xmlns:foaf="http://xmlns.com/foaf/0.1/" about="#me" rel="foaf:knows">
    <ul>
        <li typeof="foaf:Person">
            <a property="foaf:name" rel="foaf:homepage" href="  ⎫ 404
http://example.com/dansmith">Dan Smith</a>                      ⎭
        </li>
        <li typeof="foaf:Person">
            <a property="foaf:name" rel="foaf:homepage" href="  ⎫ 406
http://example.com/megjones">Meg Jones</a>                      ⎭
        </li>
        <li typeof="foaf:Person">
            <a property="foaf:name" rel="foaf:homepage" href="  ⎫ 408
http://example.com/rayjohnson">Ray Johnson</a>                  ⎭
        </li>
    </ul>
</div>
```

LOCATION BASED FRIEND FINDING

BACKGROUND

1. Field

The disclosure relates generally to an improved data processing system and, in particular, to a method and apparatus for processing data. Still more particularly, the present disclosure relates to a method and apparatus for finding persons using information on a network data processing system using a semantic web.

2. Description of the Related Art

Social networks are representations of connections between entities. These entities, typically, are people. The entities, however, also may include, for example, businesses, government entities, social clubs, and/or other types of organizations. Nodes represent these entities in a social network. Lines between the nodes indicate different types of connections between the nodes. These connections may also be referred to as types of interdependencies. These connections may take various forms, such as, for example, friendships, common interests, financial exchanges, knowledge, biological relationships, cultural relationships, professional connections, and/or other suitable types of connections.

These types of relationships may be present on network data processing systems, such as the Internet, intranets, or other types of network data processing systems. Various groups of entities may be connected to each other through various architectures. These architectures include, for example, without limitation, bulletin boards, blogs, web-based applications, and other architectures.

Web-based applications have become more common and provide users a capability to publish information with some structure. Additionally, these web-based applications allow users to define links to other users with whom they have relationships of different kinds. Examples of web-based social networks using web applications include, for example, without limitation, LinkedIN, Facebook, and other suitable types of web-based applications. With this type of information and infrastructure, different users may stay in touch with each other and also find or search for other users.

SUMMARY

The different illustrative embodiments provide a method, data processing system, and computer program product for locating people. A mobile data processing system identifies a number of degrees of separation from a requestor for use in searching for the people. The mobile data processing system searches a network data processing system for data structures that contain information about associations between the people that are within the number of degrees of separation from the requestor to generate an initial group of people. The mobile data processing system identifies a group of people from the initial group of people that are within a geographic location based on a location of the mobile data processing system and a portion of the group of people who are online. The mobile data processing system displays the portion of the group of people on a display device for the mobile data processing system.

BRIEF DESCRIPTION OF THE SEVERAL VIEWS OF THE DRAWINGS

FIG. 4 is an illustration of a data structure in accordance with an illustrative embodiment;

DETAILED DESCRIPTION

Figure 1:
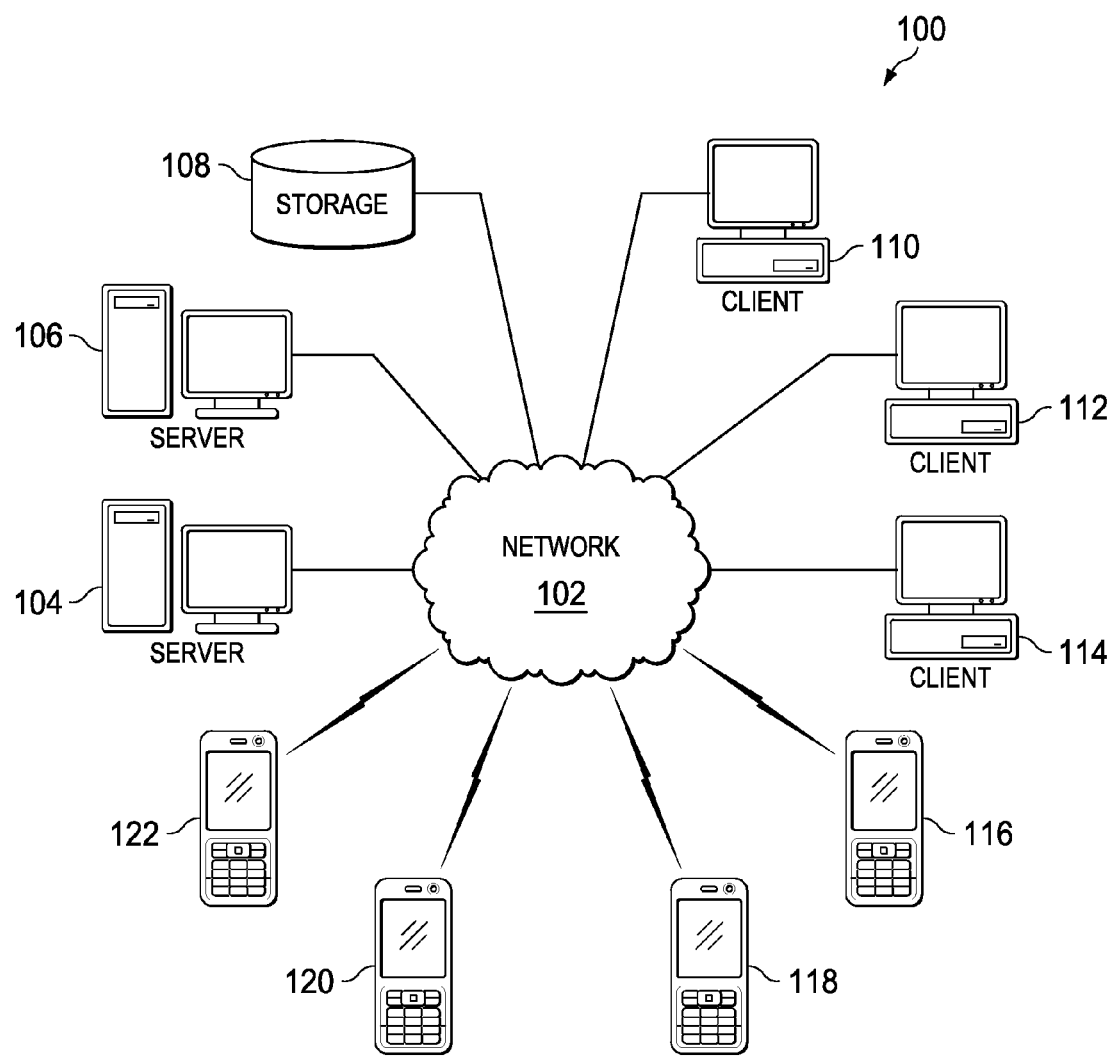
FIG. 1 is a diagram of a data processing environment in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example, without limitation, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media, such as those supporting the Internet or an intranet, or a magnetic storage device.

Note that the computer usable or computer readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction processing system, apparatus, or device. The computer usable medium may include a propagated data signal with the computer usable program code embodied therewith, either in baseband or as part of a carrier wave. The computer usable program code may be transmitted using any appropriate medium, including, without limitation, wireless, wireline, optical fiber cable, RF, etc.

Computer program code for carrying out operations of the present invention may be written in any combination of one or more programming languages, including an object-oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions.

These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide processes for implementing the functions/acts specified in the flowchart and/or block diagram block or blocks.

With reference now to the figures and, in particular, with reference to FIG. 1, a diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 is a representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Mobile data processing systems 116, 118, 120, and 122 are clients that also may access information from server computer 104 in these illustrative examples.

In addition, client computers 110, 112, and 114 and mobile data processing systems 116, 118, 120, and 122 also may communicate with each other. In these illustrative examples, mobile data processing systems 116, 118, 120, and 122 may take a number of different forms. For example, without limitation, these mobile data processing systems may be laptop computers, mobile phones, smart phones, personal digital assistants, tablet computers, and other suitable types of devices.

In these illustrative examples, client computers 110, 112, and 114 connect to network 102 through wired connections. Mobile data processing systems 116, 118, 120, and 122 connect to network 102 through wireless communications links. Users of client computers 110, 112, and 114 and mobile data processing systems 116, 118, 120, and 122 may be part of social networks that may be accessed through these client computers and mobile data processing systems. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110 or mobile data processing system 116.

In the depicted example, network data processing system 100 is the Internet with network 102 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example and not as an architectural limitation for the different illustrative embodiments.

Figure 2:
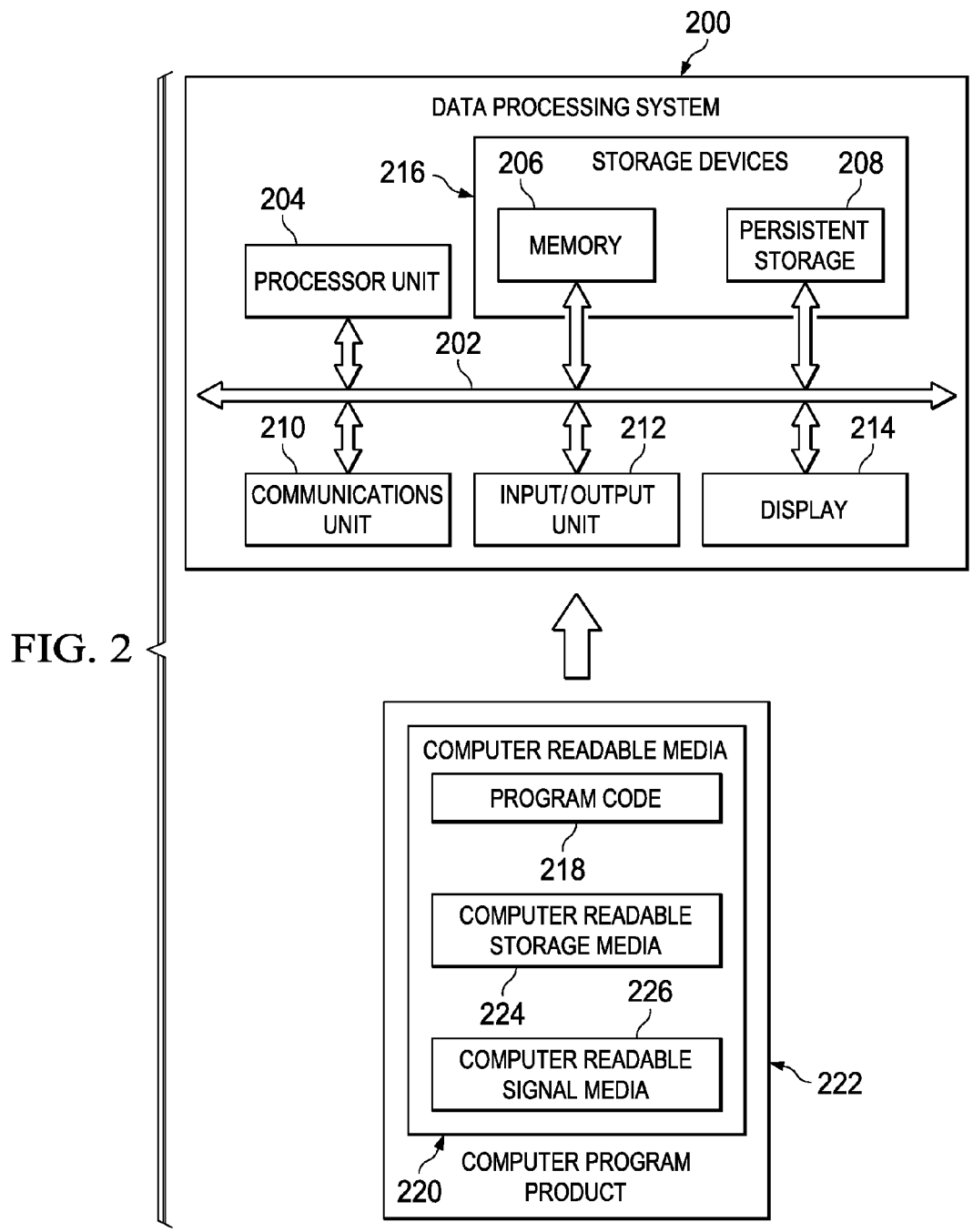
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214. Data processing system 200 may be used to implement hardware in network data processing system 100, such as, for example, without limitation, client computer 110, mobile data processing system 116, and server computer 104. Further, data processing system 200 may be used to implement other hardware in network data processing system 100. For example, data processing system 200 may be used to implement routers, proxy server computers, firewall systems, and other suitable types of hardware.

Processor unit 204 serves to run instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 or run by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 or run by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The different illustrative embodiments recognize and take into account a number of considerations. For example, the different illustrative embodiments recognize and take into account that, with social networks, different people may be able to communicate with their friends, colleagues, and/or other people through whom they have connections.

The different illustrative embodiments recognize and take into account that a person may be able to see the locations of other people through whom the person has connections. Additionally, the different illustrative embodiments also recognize and take into account that people using mobile devices may be able to find other people within selected distances or geographic boundaries. For example, the different illustrative embodiments recognize that a person may be able to locate another person when both persons have registered applications that allow them to find each other.

The different illustrative embodiments recognize and take into account that a person may wish to find other people with whom the person does not have a direct connection. For example, a person may wish to find other people who are not direct friends or colleagues. In one example, a first person who is a direct friend of a second person has one degree of separation from that second person. A third person who is a friend of the second person is not a direct friend of the first person in this example. That third person has two degrees of separation from the first person.

The different illustrative embodiments recognize and take into account that in some cases, a person may wish to find people with mutual friends, mutual colleagues, or a combination of the two. The currently available applications and processes do not provide a capability for locating people in this manner.

Thus, the different illustrative embodiments provide a method and apparatus for locating people. In the illustrative examples, a mobile data processing system identifies a number of degrees of separation from a requestor for use in searching for people. The mobile data processing system searches a network data processing system for data structures that contain information about associations between the people that are within the number of degrees of separation from the requestor to generate an initial group of people. A group of people is identified from the initial group of people within a geographic location of the mobile data processing system and the portion of the group of people who are online. The group of people is displayed on a display device for the mobile data processing system.

Figure 3:
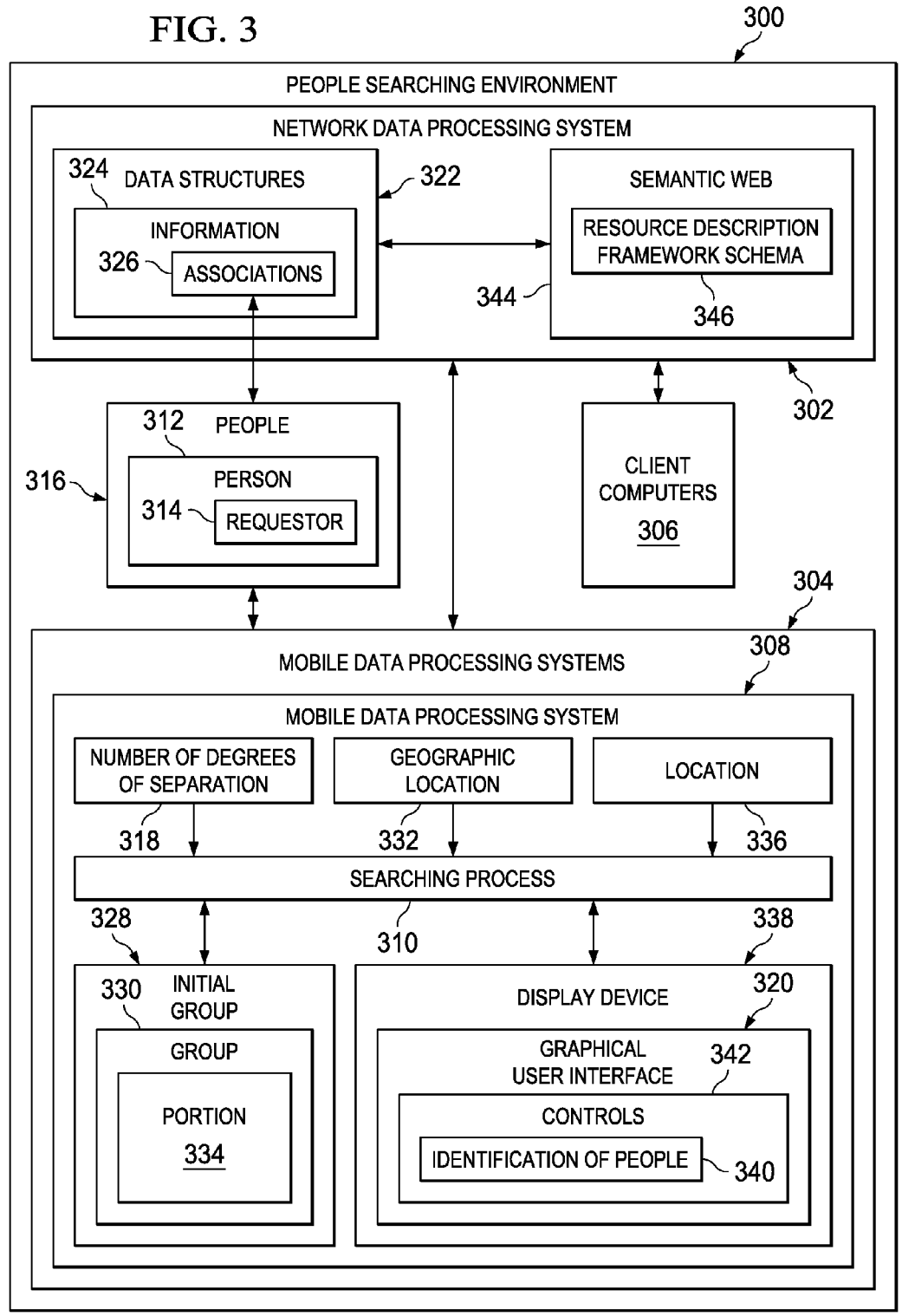
FIG. 3 is an illustration of a people searching environment in accordance with an illustrative embodiment.

With reference now to FIG. 3, an illustration of a people searching environment is depicted in accordance with an illustrative embodiment. In this example, network data processing system 100 is an example of one network data processing system that may be used to implement network data processing system 302 in people searching environment 300. In these illustrative examples, mobile data processing systems 304 and client computers 306 may access information, communicate with each other, or a combination of the two using network data processing system 302. In this illustrative example, mobile data processing system 308 in mobile data processing systems 304 includes searching process 310.

Mobile data processing systems 304 and client computers 306 may be implemented using data processing system 200 in FIG. 2. In these illustrative examples, person 312 uses mobile data processing system 308 and is requestor 314 when using searching process 310 to search for people 316.

Searching process 310 may be implemented using program code running on mobile data processing system 308. Searching process 310 also may be implemented in hardware without requiring program code.

In this illustrative example, searching process 310 begins by identifying number of degrees of separation 318 from requestor 314 for use in searching for people 316. In the depicted example, number of degrees of separation 318 is identified from a user input by person 312 to graphical user interface 320 for searching process 310. In other illustrative examples, number of degrees of separation 318 may be a default value or a value generated through the use of a policy or some other process separate from searching process 310.

With number of degrees of separation 318, searching process 310 searches network data processing system 302 for data structures 322. Data structures 322 may be located in websites, databases, and/or other sources of information located on different computers in network data processing system 302.

In these examples, data structures 322 contain information 324 that identifies associations 326 between people 316. Searching process 310 looks for people 316 having associations 326 with number of degrees of separation 318 from requestor 314. This search generates initial group 328 of people 316. Within initial group 328, searching process 310 identifies group 330 of people 316 from initial group 328 that are within geographic location 332 of mobile data processing system 308 and portion 334 of group 330 of people 316 that are online.

In the different illustrative embodiments, searching process 310 uses previously identified associations between requestor 314 and friends to form initial group 328. For example, the previously identified associations may be associations previously identified by searching process 310. These associations may be modified based on a number of factors such that initial group 328 is formed with these modifications. The number of factors may include, for example, without limitation, a change in a friend's relationships, a change in degrees of separation between the requestor and a friend, a change in a location for the friend, and/or other suitable factors.

In these illustrative examples, location 336 of mobile data processing system 308 may be obtained through a number of different types of location identification techniques. For example, location 336 may be identified using a global positioning system in mobile data processing system 308. Location 336 also may be identified through the triangulation of signals received by different radio transmission towers through which mobile data processing system 308 communicates. Geographic location 332 of people 316 in group 330 may be identified in a similar fashion. In these illustrative examples, group 330 of people 316 is displayed on display device 338 in mobile data processing system 308.

In these illustrative examples, portion 334 of group 330 of people 316 may be displayed in a number of different ways. For example, portion 334 may be displayed in graphical user interface 320 with identification of people 340 with controls 342. Identification of people 340 may include, for example, the names of persons, as well as links identifying associations for the different degrees of separation from requestor 314 to a particular person in portion 334.

Requestor 314 may manipulate controls 342 to initiate communications as desired with portion 334. In this particular example, controls 342 are graphical objects in graphical user interface 320. In this example, controls 342 provide a capability to initiate communications with one or more of the people in portion 334. These communications may be, for example, one of a text message, a call, an email message, and/or some other suitable type of communication.

In other illustrative examples, identification of people 340 includes a map on which the locations of different people in portion 334 are depicted. Further, the location of person 312 with mobile data processing system 308 also may be illustrated on this map. Additionally, the distance of the person to the different people also may be presented in graphical user interface 320.

In these illustrative examples, network data processing system 302 includes semantic web 344. Semantic web 344 comprises processes and technologies that allow data processing systems to understand the meaning of information on the web. With this type of implementation, data structures 322 may be written using a resource description framework language. Resource description framework language is a group of specifications that may be used to describe resources, such as relationships between people.

In particular, resource description framework schema 346 is used for the different descriptions of people and their associations with other people. Data structures 322 uses resource description framework schema 346 in these illustrative examples.

In this manner, person 312 may search for other people that have associations with people that person 312 knows directly. These other people may have associations in various forms. These associations may be, for example, without limitation, friends, colleagues, people with similar interests, and other suitable types of associations.

In the different illustrative embodiments, searching process 310 in mobile data processing system 308 searches network data processing system 302 for the data structures that contain the information about the associations between the people that are within the number of degrees of separation from the requestor based on previously identified associations for the requestor to generate the initial group of people.

The illustration of people searching environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, other mobile network data processing systems in mobile data processing systems 304 also may include a searching process to search for people. In still other illustrative examples, searching process 310 may be used to find people at client computers 306 who are online meeting number of degrees of separation 318 and geographic location 332. In some illustrative examples, geographic location 332 may not be used as a search criteria to identify people.

With reference now to FIG. 4, an illustration of a data structure is depicted in accordance with an illustrative embodiment. Data structure 400 is an example of one implementation for a data structure in data structures 322 in FIG. 3.

In this illustrative example, data structure 400 uses resource description framework schema 346 in FIG. 3. In particular, data structure 400 is used to identify friends of friends. Data structure 400 may be the data structure in a response to a query for searching for friends of friends. Line 402 provides an indication that data structure 400 is used to find friends of friends. In some illustrative examples, line 402 may also identify the person for which data structure 400 describes connections to friends.

Sections 404, 406, and 408 each identify a friend of the friend. Sections 404, 406, and 408 provide an identification of the person who is a friend, as well as a URL link to a homepage for the person who is the friend. In other illustrative examples, these sections also may include the manner in which the person may be contacted, such as a phone number for text messages, a screen name for use in establishing a chat session, an email address for sending emails to the person, and/or other suitable information.

Figure 5:
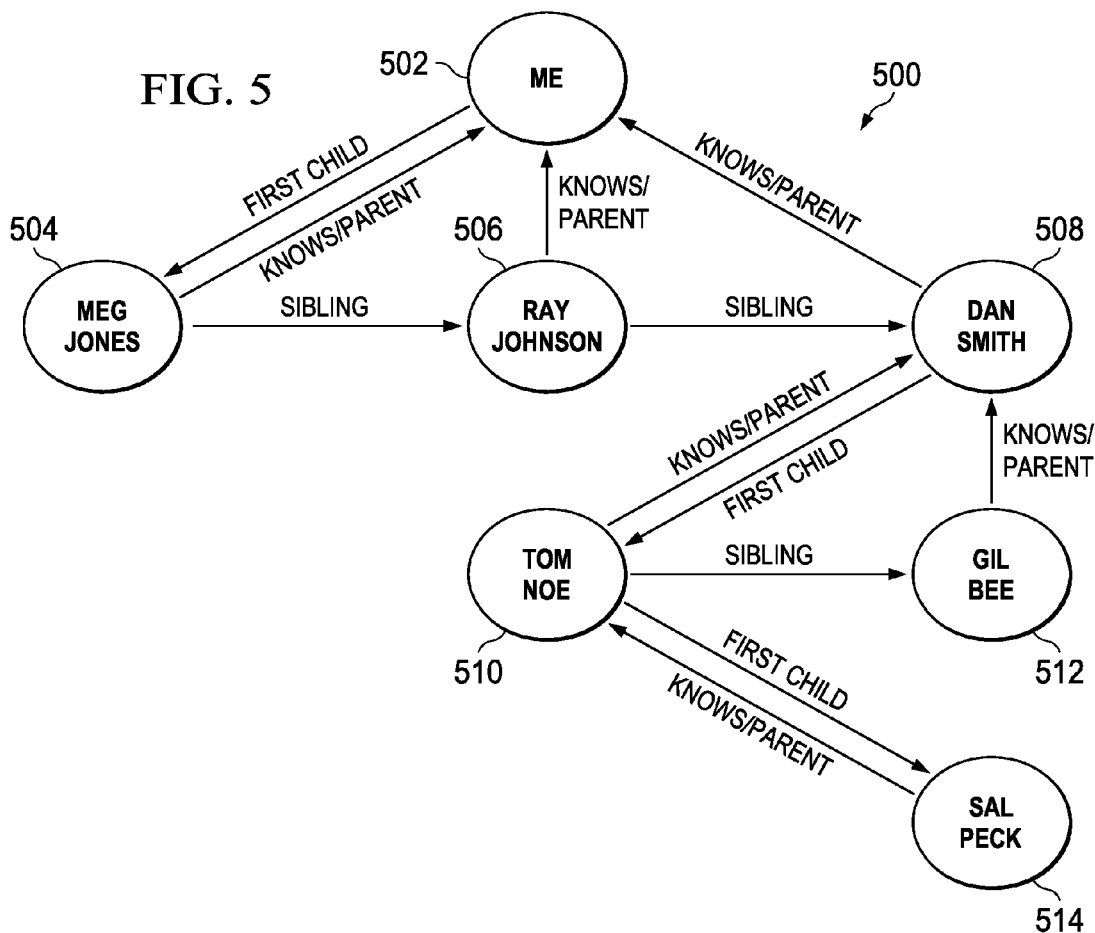
FIG. 5 is an illustration of a tree structure generated while searching for data structures in accordance with an illustrative embodiment.

With reference now to FIG. 5, an illustration of a tree structure generated while searching for data structures is depicted in accordance with an illustrative embodiment. Tree 500 is an example of a tree generated by searching process 310 when searching data structures 322.

As depicted, tree 500 has nodes 502, 504, 506, 508, 510, 512, and 514. Node 502 represents the requestor searching for people in this illustrative example. Nodes 504, 506, and 508 are people within one degree of separation from node 502. Nodes 510 and 512 are within two degrees of separation from node 502. Node 514 is within three degrees of separation from node 502.

Figure 6:
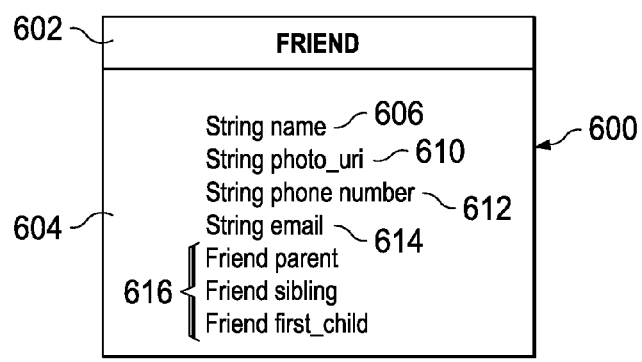
FIG. 6 is an illustration of a node in accordance with an illustrative embodiment.

With reference now to FIG. 6, an illustration of a node is depicted in accordance with an illustrative embodiment. In this depicted example, node 600 is an example of a node in tree 500 in FIG. 5 created by a searching process in searching data structures for people within a desired number of degrees of separation from the requestor. In this example, node 600 includes type identifier 602 and person information 604.

Type identifier 602 indicates the type of search performed to find the person for node 600. In this illustrative example, type identifier 602 is a friend. In other illustrative examples, the type of search performed may be for other associations other than friends. For example, the search may be for people who are associated with each other as colleagues, people with similar interests, or other suitable types of associations.

In this illustrative example, people information 604 includes name 606, photo 610, phone number 612, email 614, and associations 616. Associations 616 identify other nodes to which node 600 is connected. Associations 616 may take the form of pointers to different nodes.

Figure 7:
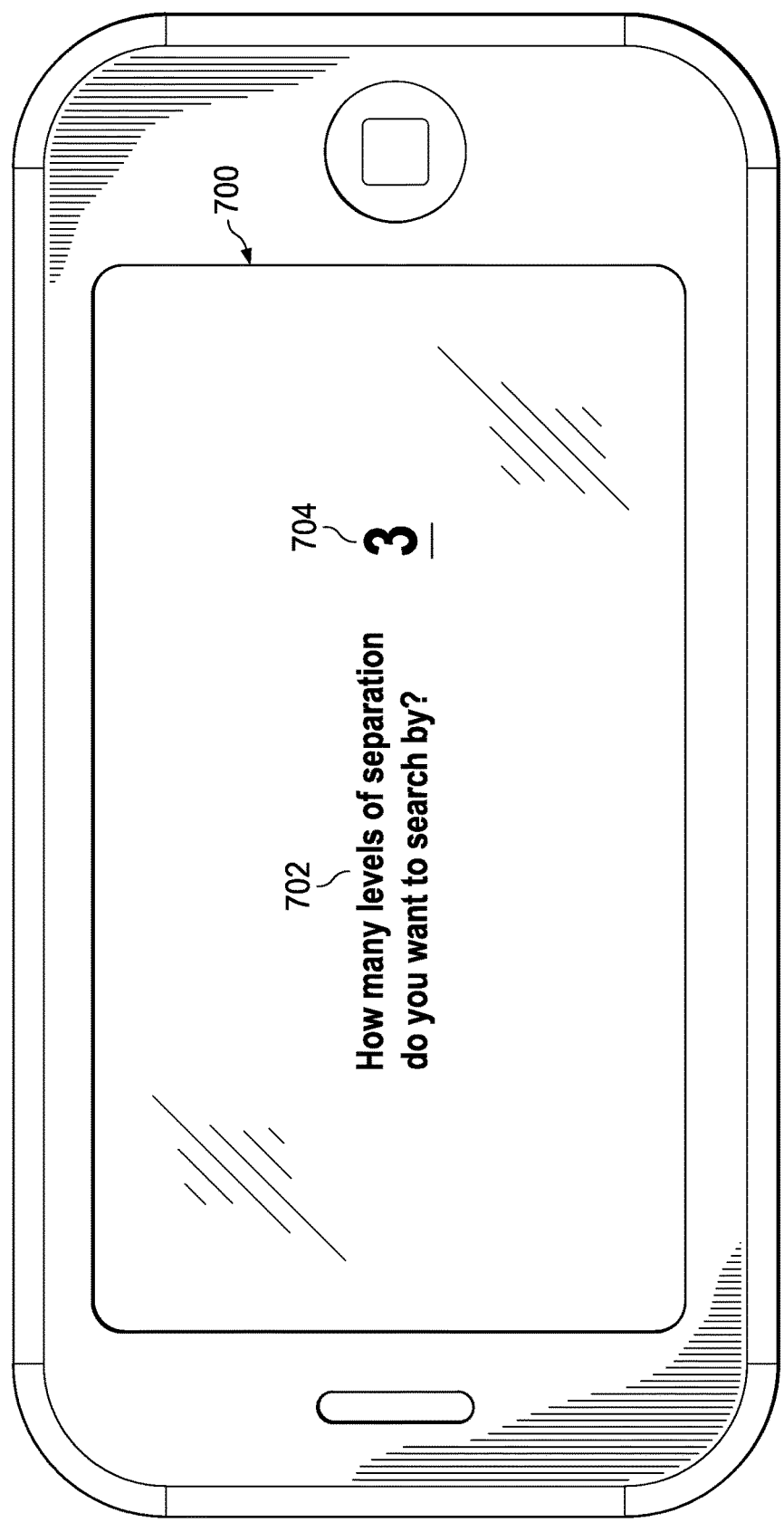
FIG. 7 is an illustration of a graphical user interface for a mobile data processing system in accordance with an illustrative embodiment.

With reference now to FIG. 7, an illustration of a graphical user interface for a mobile data processing system is depicted in accordance with an illustrative embodiment. In this illustrative example, graphical user interface 700 is an example of one implementation for graphical user interface 320 in FIG. 3. In this illustrative example, prompt 702 is for a user to enter the number of degrees of separation for which a search is to be performed in field 704. In this example, the number of degrees of separation entered into field 704 is three.

Figure 8:
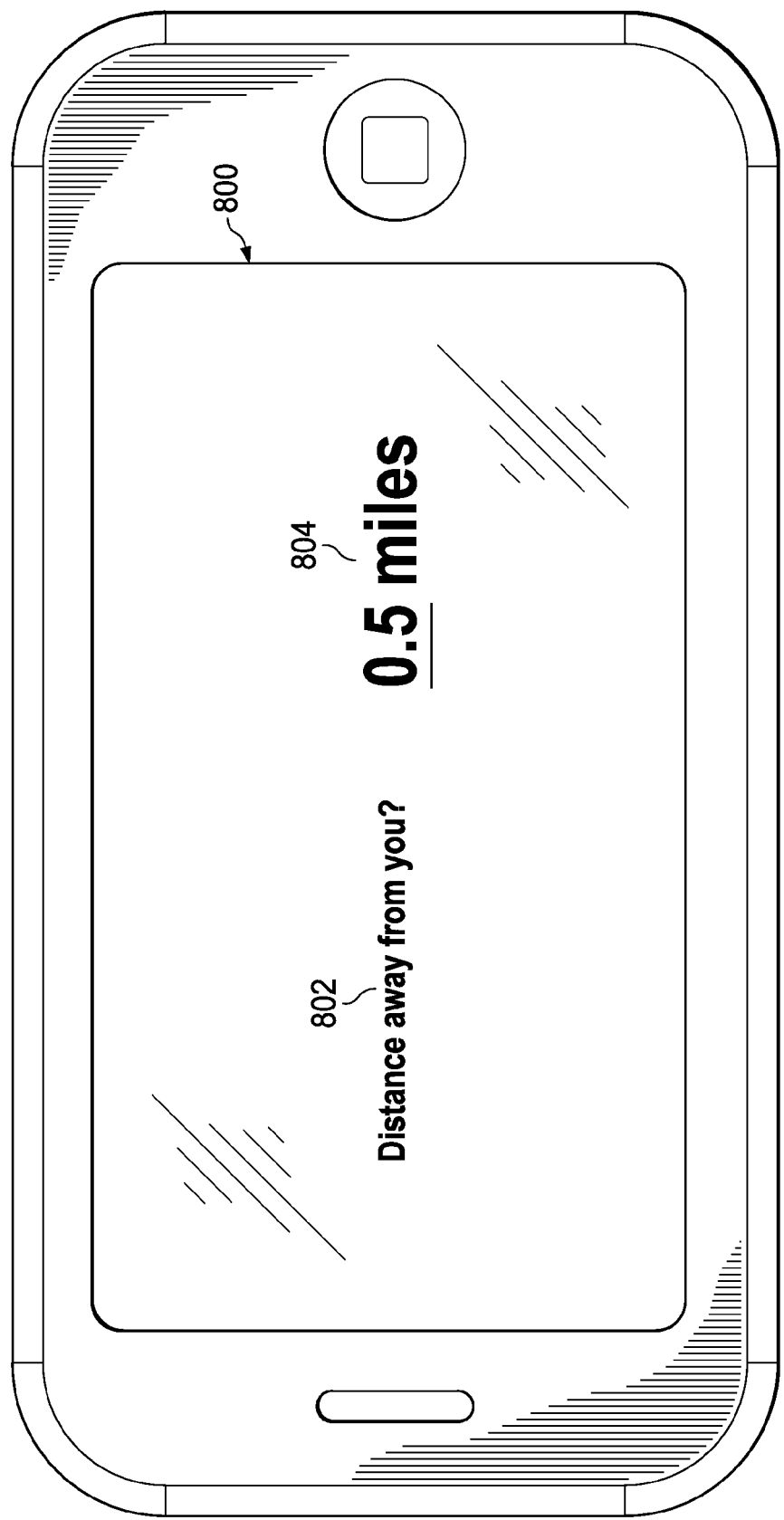
FIG. 8 is an illustration of a graphical user interface for a mobile data processing system in accordance with an illustrative embodiment.

With reference now to FIG. 8, an illustration of a graphical user interface for a mobile data processing system is depicted in accordance with an illustrative embodiment. In this illustrative example, graphical user interface 800 is an example of one implementation for graphical user interface 320 in FIG. 3.

As illustrated, prompt 802 is displayed in graphical user interface 800 to prompt a user to enter a geographic boundary for which a search is to be performed. The geographic boundary is entered in field 804. In this illustrative example, the value input is a number of miles from the mobile data processing system. In this example, the geographic boundary is a distance in a circle around the mobile data processing system that has a radius of 0.5 miles.

Figure 9:
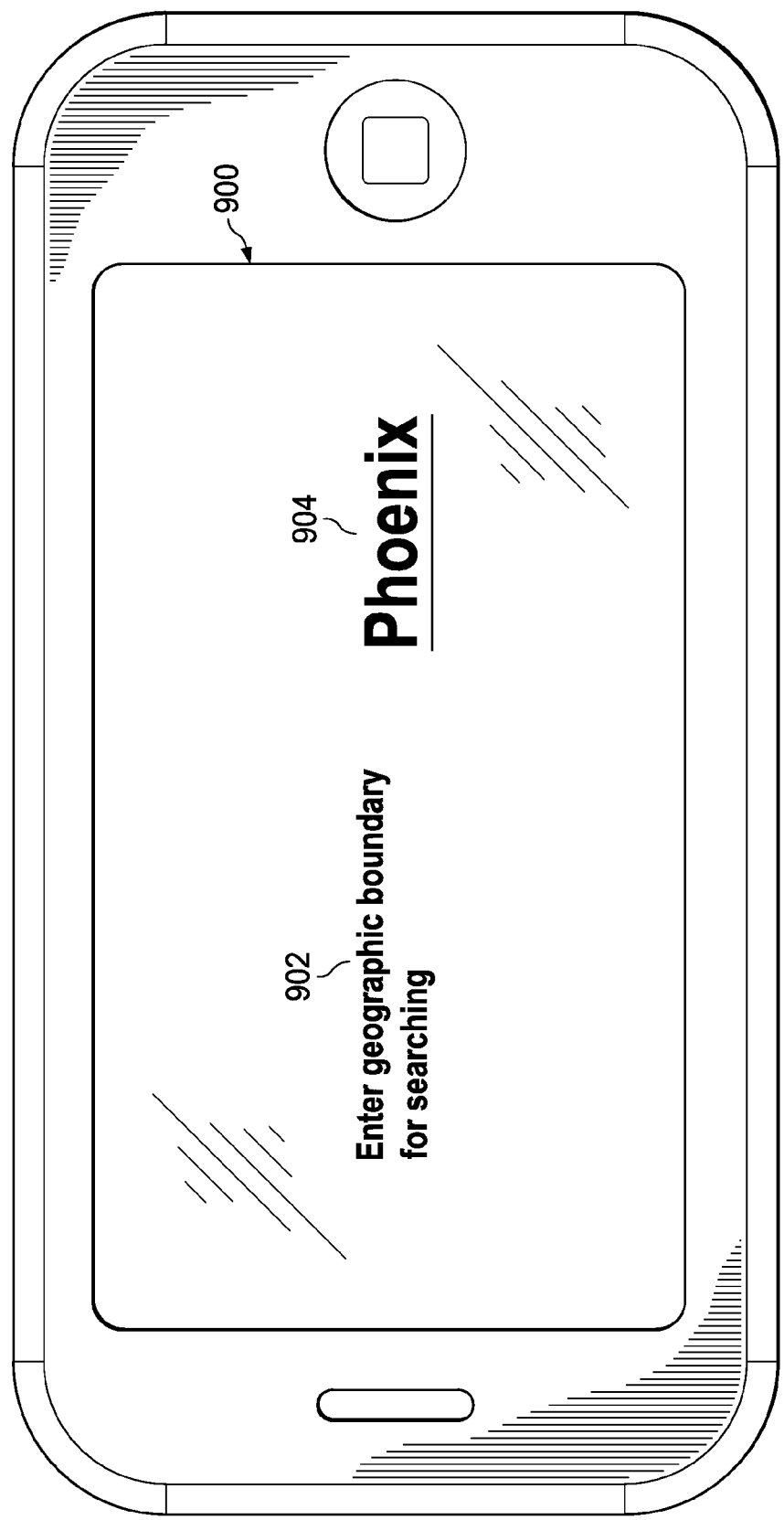
FIG. 9 is an illustration of a graphical user interface in accordance with an illustrative embodiment.

With reference now to FIG. 9, an illustration of a graphical user interface is depicted in accordance with an illustrative embodiment. In this depicted example, graphical user interface 900 is another example of an implementation for graphical user interface 320 in FIG. 3.

As depicted, prompt 902 prompts a user to enter a geographic boundary in field 904. In this illustrative example, the geographic boundary is the city, Phoenix. Of course, other geographic boundaries may be entered other than cities. For example, a user may enter a county, a state, a municipality, or other types of geographic boundaries. As a result, the geographic boundary for which the search is performed is within the city of Phoenix.

Figure 10:
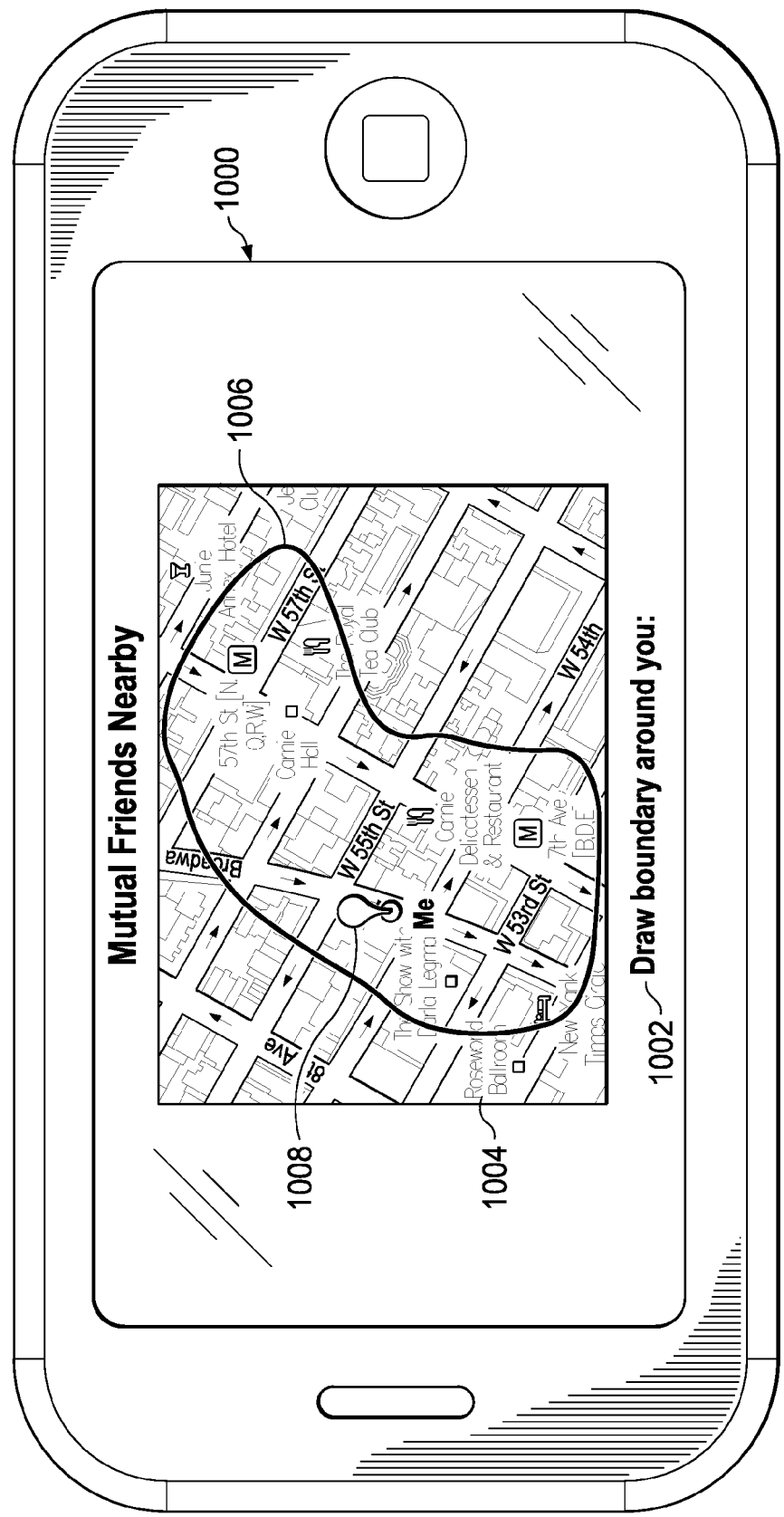
FIG. 10 is an illustration of a graphical user interface for a mobile data processing system in accordance with an illustrative embodiment.

With reference now to FIG. 10, an illustration of a graphical user interface for a mobile data processing system is depicted in accordance with an illustrative embodiment. In this particular example, graphical user interface 1000 is an example of graphical user interface 320 in FIG. 3.

As depicted, prompt 1002 prompts a user to define a geographic boundary. In this illustrative example, map 1004 is displayed within graphical user interface 1000. Indicator 1008 identifies the location of the user. The user defines the geographic boundary for the search area by drawing boundary 1006 on map 1004. Boundary 1006 defines an area of search for searching for friends.

Boundary 1006 is a boundary with an irregular shape. In these examples, boundary 1006 may be drawn using a stylus, controls on graphical user interface 1000, finger gestures made by a user, or some other suitable type of user input entered using graphical user interface 1000.

In other illustrative examples, a boundary other than boundary 1006 may be selected using map 1004. For example, the boundary may be defined by a distance from the requestor in which the distance is a traveling distance. The traveling distance is the distance that may be needed to reach a friend from the requestor using paths, such as, for example, without limitation, sidewalk paths, street paths, bike paths, vehicle routes, and/or other suitable types of paths.

Figure 11:
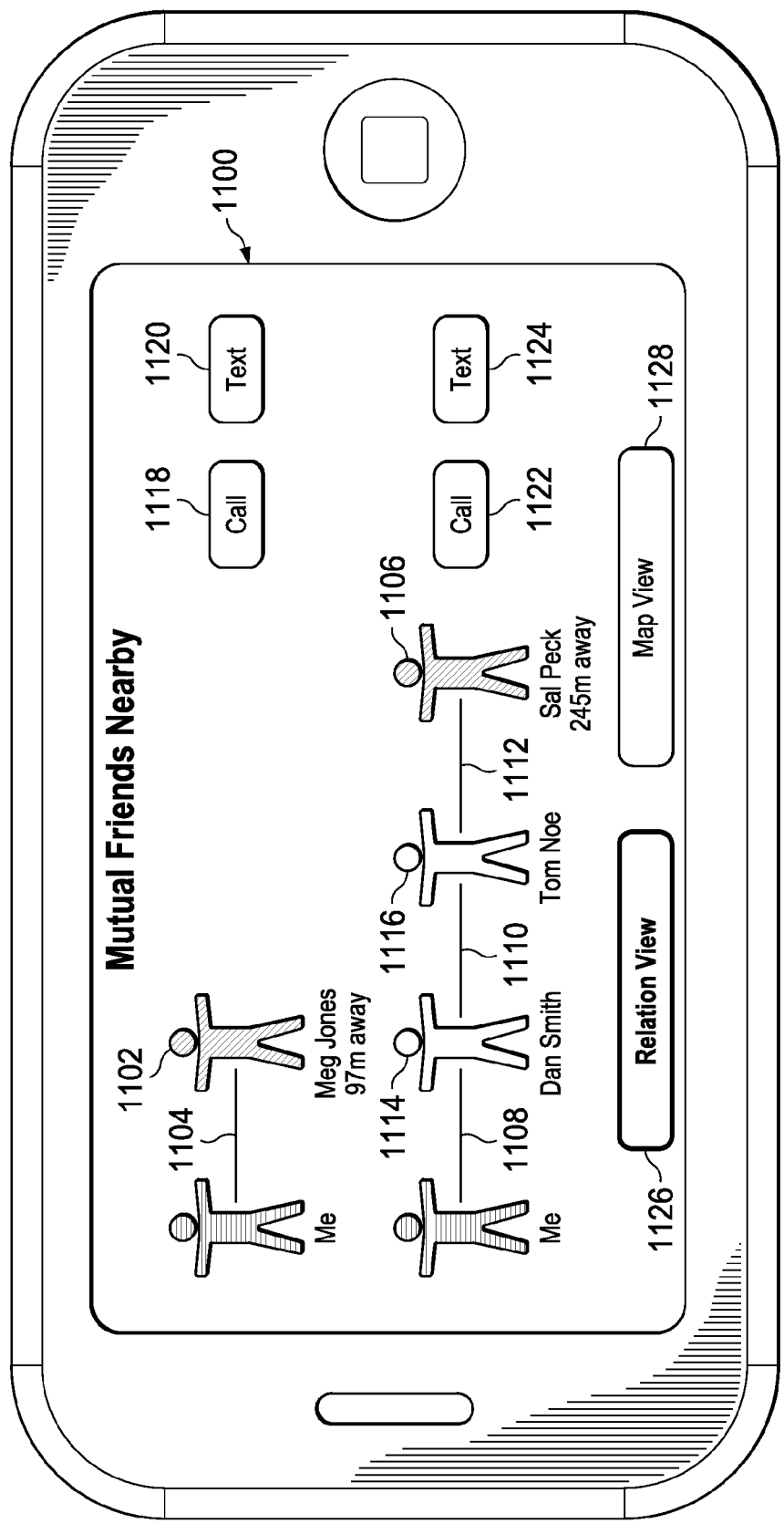
FIG. 11 is an illustration of a group of people identified from the search for other people on a graphical user interface in accordance with an illustrative embodiment.

Turning now to FIG. 11, an illustration of a group of people identified from the search for other people on a graphical user interface is depicted in accordance with an illustrative embodiment. In this example, graphical user interface 1100 provides an identification of people with respect to the requestor, who is the user in this example. Graphical user interface 1100 is an example of graphical user interface 320 in FIG. 3.

Identification 1102 indicates that Meg Jones is 97 meters away from the requestor. Additionally, graphical user interface 1100 indicates Meg Jones has one degree of separation from the requestor as shown by connection 1104. Additionally, identification 1106 indicates that Sal Peck is 245 meters away from the requestor. Identifier 1114 and identifier 1116 indicate persons through which the requestor knows Sal Peck in identification 1106. Additionally, connections 1108, 1110, and 1112 indicate that Sal Peck has three degrees of separation from the requestor.

Further, controls 1118, 1120, 1122, and 1124 on graphical user interface 1100 provide the user with the ability to initiate communications with one of the people identified. In these examples, control 1118 is used to initiate a call to Meg Jones, while control 1120 is used to send a text message to Meg Jones. Control 1122 is used to initiate a call to Sal Peck, while control 1124 is used to send a text message to Sal Peck.

Control 1126 and control 1128 allow the user to change the view of the information in graphical user interface 1100 between a relationship view and a map view. Relation view in control 1126 is the current view presented by graphical user interface 1100.

Figure 12:
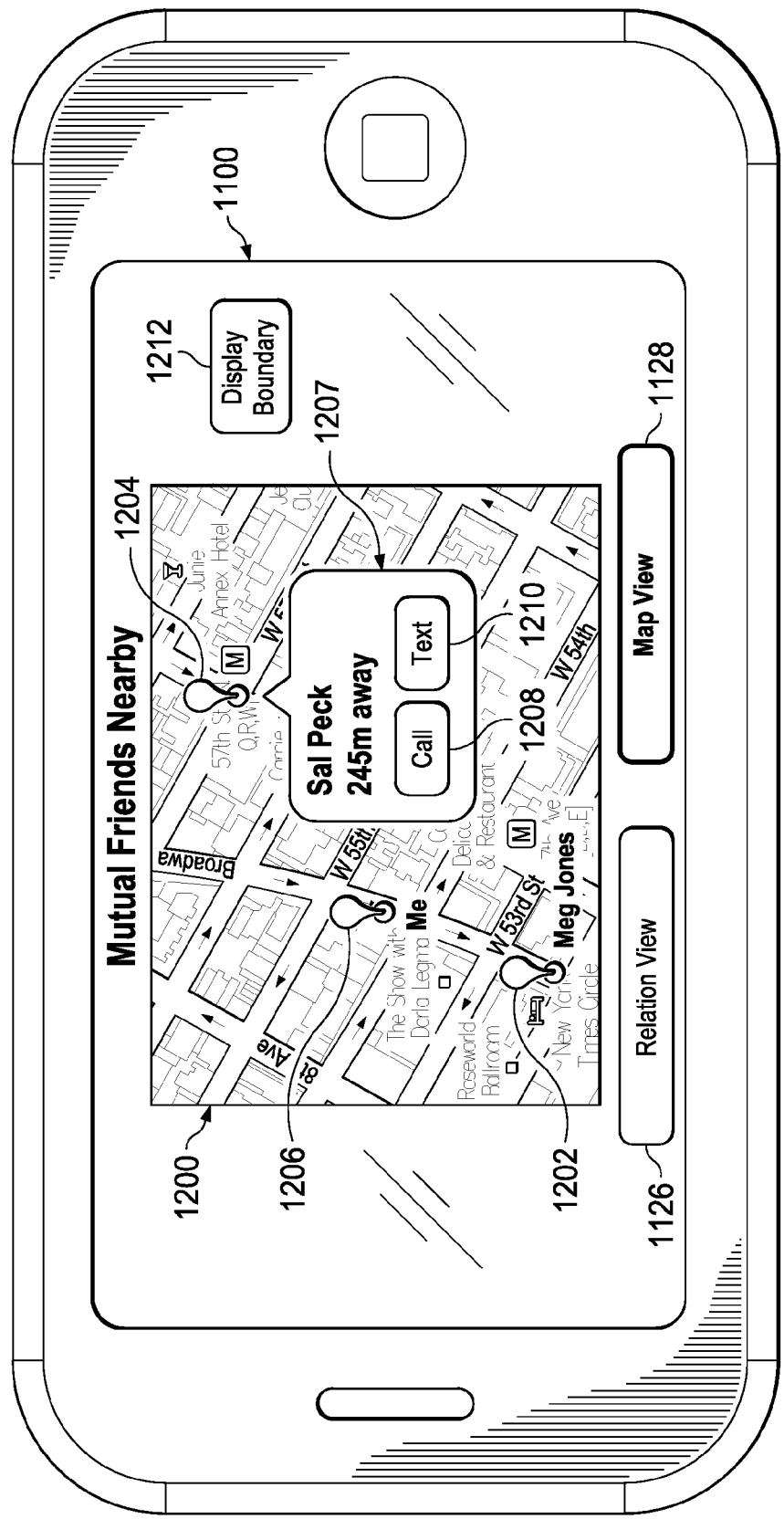
FIG. 12 is an illustration of a graphical user interface in accordance with an illustrative embodiment.

With reference now to FIG. 12, an illustration of a graphical user interface is depicted in accordance with an illustrative embodiment. As depicted, map view for control 1128 has been selected in graphical user interface 1100 from FIG. 11. When control 1128 is selected by the user, map 1200 is displayed in graphical user interface 1100.

Indicators 1202 and 1204 are indicators of people that have been identified in the search. Indicators 1202 and 1204 identify where the persons are located with respect to the user, who is the requestor in this example. Indicator 1206 identifies the location of the requestor. In these illustrative examples, a selection of an indicator may be made to present more information about the person. In this example, indicator 1204 has been selected. Balloon 1207 includes an identification of the person identified by indicator 1204, the distance from the person to the requestor, and controls 1208 and 1210. Control 1208 is used to initiate the call to the person identified by indicator 1204. Control 1210 is used to send a text message to the person.

Display boundary control 1212 allows a user to display a boundary of map 1200 on graphical user interface 1100. Display boundary control 1212 is shown de-selected in graphical user interface 1100.

Figure 13:
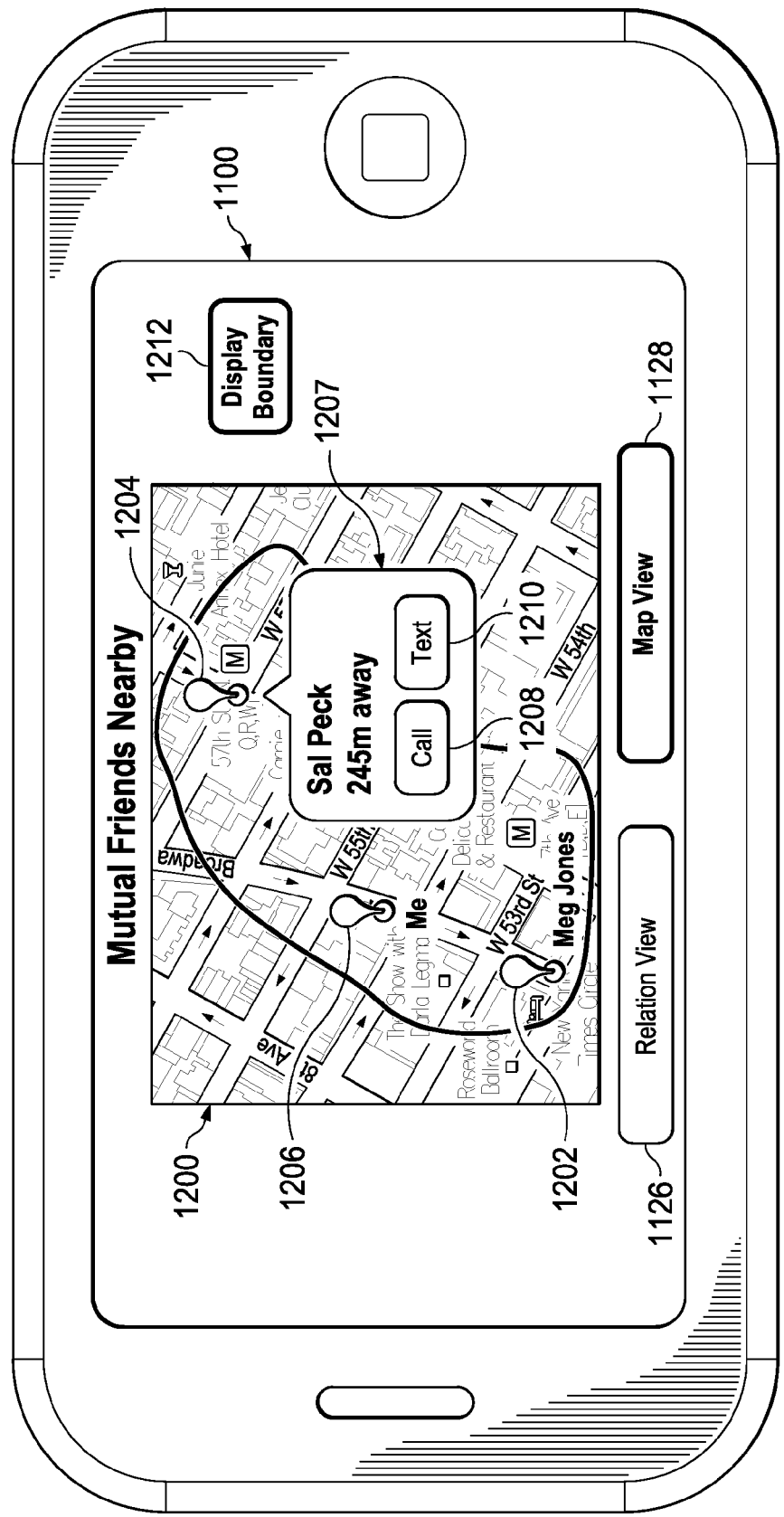
FIG. 13 is an illustration of a graphical user interface in accordance with an illustrative embodiment.

With reference now to FIG. 13, an illustration of a graphical user interface is depicted in accordance with an illustrative embodiment. As depicted, map view for control 1128 and display boundary control 1212 have been selected in graphical user interface 1100. The boundary used for the search is displayed. This boundary may be a boundary, such as, for example, boundary 1006 on map 1004 on graphical user interface 1000 in FIG. 10.

The illustration of graphical user interfaces 700, 800, 900, 1000, and 1100 are presented as examples of one manner in which graphical user interface 320 in FIG. 3 may be implemented. Other illustrative embodiments may depict information using other types of mechanisms or presentations other than those shown in FIGS. 7-13.

Display boundary control 1212 allows a user to display a boundary of map 1200 on graphical user interface 1100. Display boundary control 1212 is shown de-selected in graphical user interface 1100.

Figure 14:
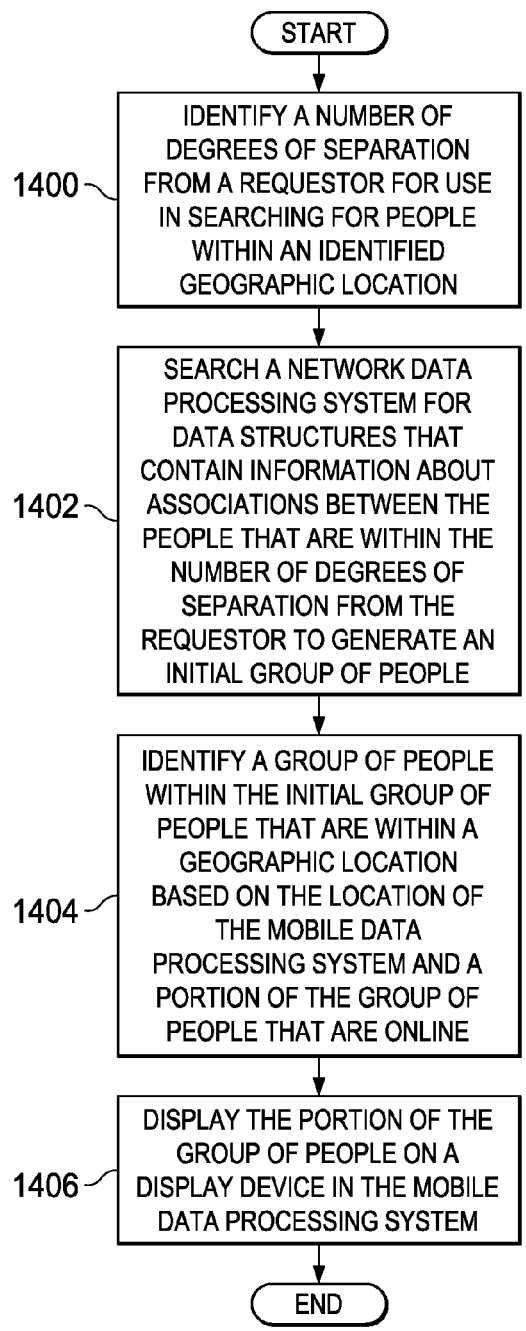
FIG. 14 is an illustration of a flowchart of a process for locating people in accordance with an illustrative embodiment.

With reference now to FIG. 14, an illustration of a flowchart of a process for locating people is depicted in accordance with an illustrative embodiment. The process illustrated in FIG. 14 is a high-level flowchart of a process that may be implemented in searching process 310 in FIG. 3. The different steps illustrated in this flowchart may be implemented using program code, hardware, or a combination of the two, depending on the particular implementation.

The process begins by identifying a number of degrees of separation from the requestor for use in searching for people within an identified geographic location (step 1400). Step 1400 is performed using a mobile data processing system. In these examples, the number of degrees of separation may be identified by user input entered by the requestor through a graphical user interface for the mobile data processing system. The process then searches a network data processing system for data structures that contain information about associations between the people that are within the number of degrees of separation from the requestor to generate an initial group of people (step 1402).

The process then identifies a group of people within the initial group of people that are within a geographic location based on the location of the mobile data processing system and a portion of the group of people that are online (step 1404). Identification of people that are online may be done by sending an availability request message to the group of people within the geographic location and then receiving replies indicating which of the people are online. In other examples, the online status of people may be maintained by and retrieved from one or more data processing systems configured for storing the availability status of users.

The process then displays the portion of the group of people on a display device in the mobile data processing system (step 1406), with the process terminating thereafter. The graphical user interface is on the display device.

Figure 15:
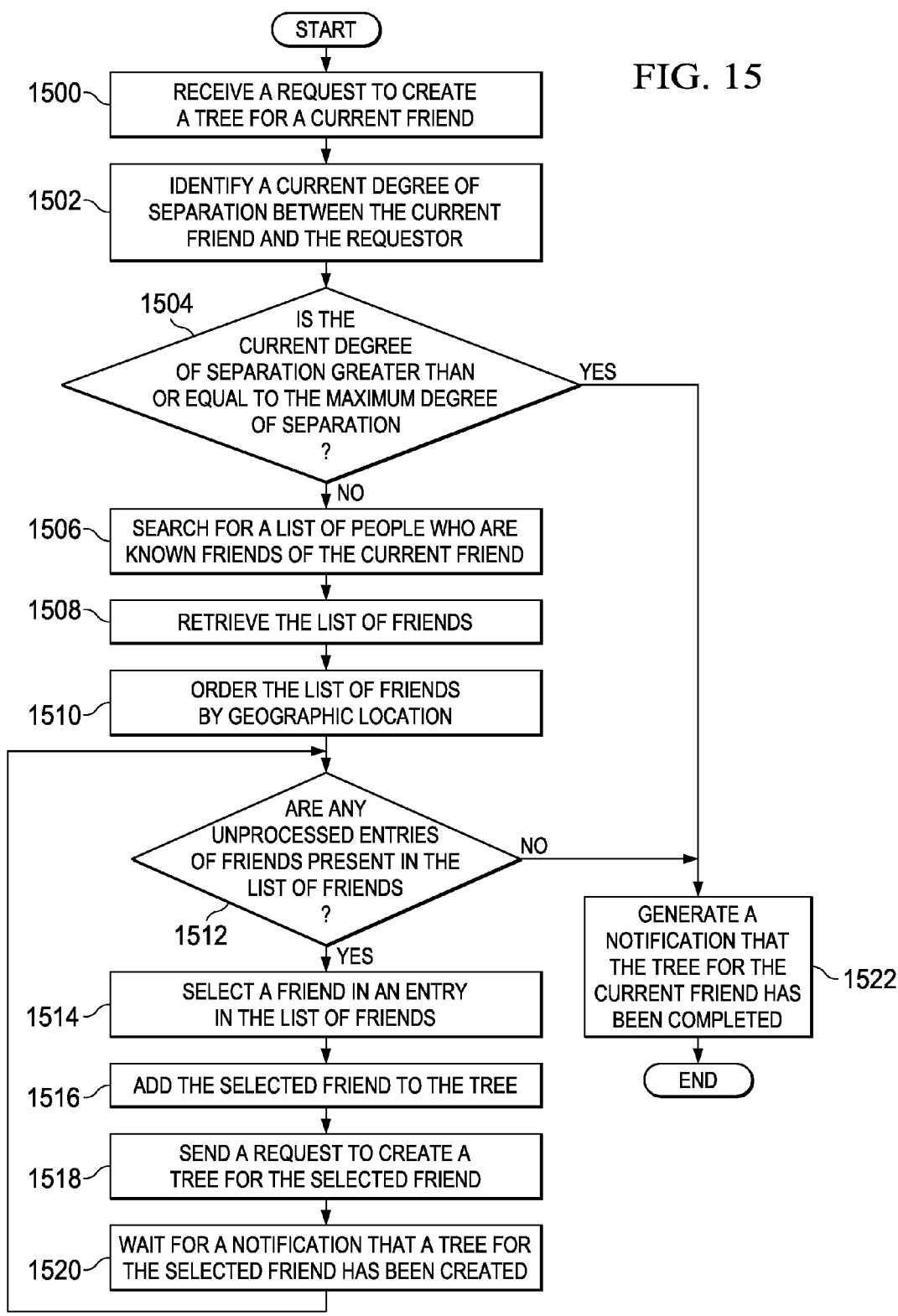
FIG. 15 is an illustration of a flowchart of a process for locating people in accordance with an illustrative embodiment.

With reference now to FIG. 15, an illustration of a flowchart of a process for locating people is depicted in accordance with an illustrative embodiment. The different steps illustrated in this flowchart may be implemented using program code, hardware, or a combination of the two, depending on the particular implementation. The process in FIG. 15 may be implemented in searching process 310 in FIG. 3. This process is an example of one manner in which a tree containing friends may be generated. This process may be used to generate a tree, such as, for example, tree 500 in FIG. 5.

The process illustrated in FIG. 15 may be a recursive process. For example, the process may send itself recursive requests to repeat the steps of the process before the process completes.

The process begins by receiving a request to create a tree for a current friend (step 1500). The tree is created in response to searching for friends of a requestor within a number of degrees of separation. For example, friends of the requestor having a degree of separation from the requestor within a maximum degree of separation are to be identified in the tree.

In this example, in step 1500, the request received includes an identification of a maximum degree of separation from the requestor. This maximum degree of separation is used to identify the total depth for the friend tree. The first time through the process, the current friend is the requestor. Otherwise, the current friend is a friend of the requestor in a partially formed tree and has a number of degrees of separation from the requestor in the partially formed tree.

The process then identifies a current degree of separation between the current friend and the requestor (step 1502). In step 1502, when the current friend is the requestor, the current degree of separation is zero. When the current friend is not the requestor, the current degree of separation may be identified by calculating the number of links between the current friend and the requestor in the partially formed tree.

The process then determines whether the current degree of separation is greater than or equal to the maximum degree of separation (step 1504). If the current degree of separation is not greater than or equal to the maximum degree of separation, the process searches for a list of people who are known friends of the current friend (step 1506). The search may be performed by forming a query to a network data processing system, such as network data processing system 302 in FIG. 3, for data structures for people having associations with the current friend.

In response to finding the list of people who are known friends of the current friend, the process retrieves the list of friends (step 1508). The process then orders the list of friends by geographic location (step 1510). For example, the process may order the list of friends by distance from the friend to the requestor. Thereafter, the process determines if there are any unprocessed entries of friends in the list of friends (step 1512). If unprocessed entries are present in the list of friends retrieved, the process selects a friend in an entry in the list of friends (step 1514).

Next, the process adds the selected friend to the tree (step 1516). Step 1516 may be performed by adding the selected friend as a child of the current friend. Further, the current friend is identified as the parent of the selected friend.

Thereafter, the process sends a request to the process to create a tree for the selected friend (step 1518). In step 1518, this request is a different request than is received in step 1500 as described above. In this manner, the selected friend becomes the current friend in step 1500.

The process waits for a notification that a tree has been created for the selected friend (step 1520). In response to receiving the notification that the tree has been created for the selected friend, the process returns to step 1512 as described above.

With reference again to step 1512, if unprocessed entries are not present in the list of friends, the process generates a notification to the process that the tree for the current friend has been completed (step 1522), with the process terminating thereafter. When the notification is received for the requestor, the tree for the requestor with the maximum degree of separation is complete. With reference again to operation 1504, if the current degree of separation is greater than or equal to the maximum degree of separation, the process continues to step 1522 as described above.

Figure 16:
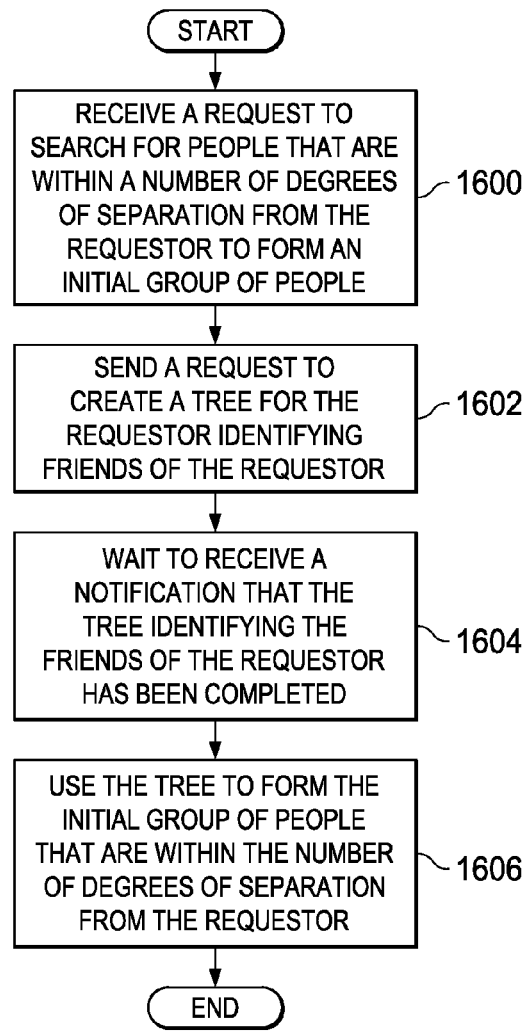
FIG. 16 is an illustration of a flowchart of a process for locating people in accordance with an illustrative embodiment.

With reference now to FIG. 16, an illustration of a flowchart of a process for locating people is depicted in accordance with an illustrative embodiment. The process illustrated in FIG. 16 is a more-detailed process for step 1402 in FIG. 14.

The process begins by receiving a request to search for people that are within a number of degrees of separation from the requestor to form an initial group of people (step 1600). The process then sends a request to create a tree for the requestor identifying friends of the requestor (step 1602). This request may be received in, for example, operation 1500 in FIG. 15. The tree may be created using the process described in FIG. 15.

Thereafter, the process waits to receive a notification that the tree identifying the friends of the requestor has been completed (step 1604). In response to receiving the notification that the tree has been completed, the process uses the tree to form the initial group of people that are within the number of degrees of separation from the requestor (step 1606), with the process terminating thereafter.

Thus, the different illustrative embodiments provide a method and apparatus for locating people. In the illustrative embodiments, a mobile data processing system identifies a number of degrees of separation from a requestor for use in searching for people. The mobile data processing system searches a network data processing system for data structures that contain information about associations between the people that are within the number of degrees of separation from the requestor to generate an initial group of people. The process then identifies a group of people from the initial group of people that are within a geographic location based on the location of the mobile data processing system and the portion of the group of people who are online. The process then displays the group of people on a display device for the mobile data processing system.

In this manner, users may locate people having a relationship within a desired degree of separation from the requestor that are within a geographic boundary. Further, the different illustrative embodiments may initiate communications with a person selected from the group of people displayed on the display device. In this manner, the different illustrative embodiments provide a more efficient manner for locating people and initiating communications with people.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer usable or computer readable medium providing program code for use by or in connection with a computer or any instruction processing system. For the purposes of this description, a computer usable or computer readable medium can be any tangible apparatus that can contain, store, communicate, propagate, or transport the program for use by or in connection with the instruction processing system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual running of the program code, bulk storage, and cache memories, which provide temporary storage of at least some program code in order to reduce the number of times code must be retrieved from bulk storage during running of the code.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, remote printers, or storage devices through intervening networks. Modems, cable modem, and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for locating people, the method comprising:
   identifying, by a mobile data processing system, a number of degrees of separation from a requestor in searching for the people;
   searching, by the mobile data processing system, a network data processing system for data structures that contain information about associations between the people that are within the number of degrees of separation from the requestor to generate an initial group of people;
   defining a geographic boundary for the searching by receiving a drawing of a boundary with an irregular shape on a map;
   identifying, by the mobile data processing system, a group of people from the initial group of people that are within a geographic location based on a location of the mobile data processing system and a portion of the group of people who are online; and
   displaying, by the mobile data processing system, the portion of the group of people on a display device for the mobile data processing system;
   displaying a first control and a second control, the first control to change the display to a relationship view and the second control to change the display to a map view;
   displaying, in the relationship view:
      an identification of each person in the portion of the group of people displayed on the display device;
      a degree of separation from the requestor to the identification of the each person in the portion of the group of people displayed on the display device;
      a distance between the each person in the portion of the group of people displayed on the display device and the mobile data processing system; and
      a first communication control and a second communication control for each person in the portion of the group of people,
         the first communication control to initiate a call with a respective person in the portion of the group of people, and
         the second communication control to send a text message to the respective person;
   displaying, in the map view:
      a map with a location of each person in the portion of the group of people displayed on the display device for the mobile data processing system;
      a balloon related to a person in the portion of the group of people when the person is selected;
      a third communication control in the balloon to initiate a call with the person;
      a fourth communication control in the balloon to send a text message to the respective person;
      a distance in the balloon between the person and the mobile data processing system; and
      a boundary control to control display of the geographic boundary used for the searching.

2. The method of claim 1 further comprising:
   responsive to selecting a person in the group of people displayed on the display device, initiating communications with the person.

3. The method of claim 2, wherein the communications are selected from one of a text message, a call, and an email message.

4. The method of claim 1 further comprising:
   displaying controls to initiate communication from the mobile data processing system to each person in the portion of the group of people displayed on the display device.

5. The method of claim 4, wherein the step of displaying the controls to initiate the communication from the mobile data processing system to the each person in the portion of the group of people displayed on the display device comprises:
   displaying a control for each type of communication for contacting the each person in the portion of the group of people, wherein the control is configured to initiate the communication from the mobile data processing system to the each person in the group of people in response to being manipulated.

6. The method of claim 1, wherein the displaying step comprises:
   displaying a map with a location of each person in the portion of the group of people displayed on the display device for the mobile data processing system.

7. The method of claim 1, wherein the displaying step comprises:
   displaying an identification of each person in the portion of the group of people displayed on the display device; and
   displaying a degree of separation from the requestor to the identification of the each person in the portion of the group of people displayed on the display device.

8. The method of claim 7 further comprising:
   displaying a distance between the each person in the portion of the group of people displayed on the display device and the mobile data processing system.

9. The method of claim 1, wherein the data structures are located in at least one of a web-based social network, a website, and a web page,
   wherein the searching step comprises:
      searching a set of social networks on the network data processing system for the data structures that contain the information for the people based on the number of degrees of separation identified for use in searching for the people.

10. The method of claim 1, wherein the step of searching, by the mobile data processing system, the network data processing system for the data structures that contain the information about the associations between the people that are within the number of degrees of separation from the requestor to generate the initial group of people comprises:
    searching, by the mobile data processing system, the network data processing system for the data structures that contain the information about the associations between the people that are within the number of degrees of separation from the requestor based on previously identified associations for the requestor to generate the initial group of people.

11. The method of claim 1, wherein the geographic location is selected from at least one of a distance, a geographic boundary, a city, a state, and a country.

12. The method of claim 1, wherein the data structures use a resource description framework schema.

13. The method of claim 1, wherein the identifying of a number of degrees of separation comprises:
    building a tree structure based on identifying the people associated with the requestor that are within the number of degrees of separation from the requestor identified for use in searching for the people.

14. The method of claim 1 further comprising:
defining a geographic boundary for the searching by drawing a boundary with an irregular shape on a map;
displaying a first control and a second control, the first control to change the display to a relationship view and the second control to change the display to a map view;
displaying, in the relationship view:
- an identification of each person in the portion of the group of people displayed on the display device;
- a degree of separation from the requestor to the identification of the each person in the portion of the group of people displayed on the display device;
- a distance between the each person in the portion of the group of people displayed on the display device and the mobile data processing system; and
- a first communication control and a second communication control for each person in the portion of the group of people,
    - the first communication control to initiate a call with a respective person in the portion of the group of people, and
    - the second communication control to send a text message to the respective person;

displaying, in the map view:
- a map with a location of each person in the portion of the group of people displayed on the display device for the mobile data processing system;
- a balloon related to a person in the portion of the group of people when the person is selected;
- a third communication control in the balloon to initiate a call with the person;
- a fourth communication control in the balloon to send a text message to the respective person;
- a distance in the balloon between the person and the mobile data processing system; and
- a boundary control to control display of the geographic boundary used for the searching.

15. A data processing system for locating people, the data processing system comprising:
a storage device containing program code; and
a processor unit connected to a bus, wherein the processor unit runs the program code to identify a number of degrees of separation from a requestor for use in searching for the people; search a network data processing system for data structures that contain information about associations between the people that are within the number of degrees of separation from the requestor to generate an initial group of people; identify a group of people from the initial group of people that are within a geographic location based on a location of a mobile data processing system and a portion of the group of people who are online; and display the portion of the group of people on a display device for the mobile data processing system.

16. The data processing system of claim 15, wherein the processor unit further runs the program code to initiate communications with a person in response to selecting the person in the group of people displayed on the display device.

17. The data processing system of claim 16, wherein the communications are selected from one of a text message, a call, and an email message.

18. The data processing system of claim 15, wherein the processor unit further runs the program code to display controls to initiate communication from the mobile data processing system to each person in the portion of the group of people displayed on the display device.

19. The data processing system of claim 18, wherein in running the program code to display the controls to initiate the communication from the mobile data processing system to the each person in the portion of the group of people displayed on the display device, the processor unit runs the program code to display a control for each type of communication for contacting the each person in the portion of the group of people, wherein the control is configured to initiate the communication from the mobile data processing system to the each person in the group of people in response to being manipulated.

20. A computer program product for locating people, the computer program product comprising:
a non-transitory computer readable storage medium; and
program code, stored on the non-transitory computer readable storage medium, for identifying, by a mobile data processing system, a number of degrees of separation from a requestor for use in searching for the people;
program code, stored on the non-transitory computer readable storage medium, for searching, by the mobile data processing system, a network data processing system for data structures that contain information about associations between the people that are within the number of degrees of separation from the requestor to generate an initial group of people;
program code, stored on the non-transitory computer readable storage medium, for identifying a group of people from the initial group of people that are within a geographic location based on a location of the mobile data processing system and a portion of the group of people who are online; and
program code, stored on the non-transitory computer readable storage medium, for displaying the portion of the group of people on a display device for the mobile data processing system.

* * * * *